United States Patent [19]

Drent

[11] Patent Number: 5,071,926
[45] Date of Patent: Dec. 10, 1991

[54] POLYMERIC POLYALCOHOLS

[75] Inventor: Eit Drent, Amsterdam, Netherlands

[73] Assignee: Shell Oil Company, Houston, Tex.

[21] Appl. No.: 383,515

[22] Filed: Jul. 24, 1989

[30] Foreign Application Priority Data

Jul. 29, 1988 [NL] Netherlands .......................... 8801908

[51] Int. Cl.$^5$ ............................................. C08G 67/02
[52] U.S. Cl. ..................................... 525/539; 528/392
[58] Field of Search .......................... 525/539; 528/392

[56] References Cited

U.S. PATENT DOCUMENTS

| 3,950,427 | 4/1976 | Engel et al. | 568/325 |
| 4,396,761 | 8/1983 | Willis et al. | 528/498 |
| 4,595,749 | 6/1986 | Hoxmeier | 528/486 |
| 4,866,128 | 9/1989 | Gergen et al. | 525/92 |
| 4,868,254 | 9/1989 | Wong | 525/539 |
| 4,929,701 | 5/1990 | van Broekhoven | 525/539 |

OTHER PUBLICATIONS

G. Marc Loudon, "Organic Chemistry", Addison-Wesley Publishing Company, 1984.

*Primary Examiner*—John C. Bleutge
*Assistant Examiner*—Thomas Hamilton, III

[57] ABSTRACT

Novel polymeric polyalcohols are produced by hydrogenation of a linear alternating polymer of carbon monoxide and at least one ethylenically unsaturated hydrocarbon by contact with molecular hydrogen under hydrogenation conditions in the presence of a catalyst formed from a nickel salt and certain alkali metal hydrides.

9 Claims, No Drawings

POLYMERIC POLYALCOHOLS

FIELD OF THE INVENTION

This invention relates to novel polymeric polyalcohols having a plurality of secondary alcohol groups in a polymeric chain separated by monomeric two-carbon connecting groups, and to a process for the production of such alcohols. More particularly, the invention relates to a process for the hydrogenation of a linear alternating polymer of carbon monoxide and at least one α-olefin to produce such polymeric polyalcohols.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now becoming known as polyketones or polyketone polymers, has become of greater interest in part because of the greater availability of the polymers. The more recent general processes for the production of the polyketone polymers are illustrated by a number of published European Patent Applications including 121,965, 181,014, 222,454 and 257,663. The process generally involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight materials having established utility as premium thermoplastics in, for example, the production of containers for food and drink which are produced by methods which are conventional for thermoplastics. It is useful, on occasion, to modify the properties of a polyketone polymer by producing derivatives of the carbonyl groups to obtain polymers of somewhat different character. A copending U.S. patent application Ser. No. 138,767, filed Dec. 29, 1987, now U.S. Pat. No. 4,868,254 describes the hydrogenation of a linear alternating copolymer of carbon monoxide and ethylene to produce a polymeric polyalcohol having a high percentage of the monomeric units present of the structure —CH(OH)—CH$_2$—CH$_2$—. U.S. Pat. No. 2,495,292 describes a similar process for the hydrogenation of a carbon monoxide/ethylene polymer which is not a linear alternating copolymer and therefore produces, upon hydrogenation, polymeric polyalcohols having a plurality of random monomeric units. It would be of advantage, however, to provide other hydrogenated derivatives of polyketone polymers having a plurality of monomeric units but a regular arrangement of such units.

SUMMARY OF THE INVENTION

The present invention provides certain hydrogenated polyalcohol derivatives of linear alternating polymers of carbon monoxide and at least one hydrocarbon α-olefin, and a method for producing such polyalcohol derivatives by hydrogenation of the linear alternating polymers. More particularly the invention provides a process for the hydrogenation of the linear alternating polymers employing a catalyst composition formed from a nickel compound and certain metal hydrides.

DESCRIPTION OF THE INVENTION

The polyketone polymers which are employed in the process of the invention are linear alternating polymers of carbon monoxide and at least one ethylenically unsaturated hydrocarbon. The unsaturated hydrocarbon precursors of the polyketone polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylene unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second α-olefin of at least 3 carbon atoms, particularly propylene.

When the preferred terpolymers are employed as reactants in the process of the invention, there will be at least about 2 units incorporating a moiety of ethylene for each unit incorporating a moiety of the second α-olefin. Preferably there will be from about 10 to about 100 units incorporating a moiety of ethylene for each unit incorporating a moiety of the second α-olefin. The polymeric chain of the preferred polyketone reactants is therefore represented by the repeating formula

$$\text{─[CO─[CH}_2\text{─CH}_2\text{]}_x\text{─[CO─[G]}_y\text{─}} \quad (I)$$

wherein G is a moiety of the second α-olefin polymerized through the ethylenic unsaturation thereof. The —CO─[C$_2$H$_4$]— units and the —CO─[G]— units are formed randomly throughout the polymer chain and the ratio of y:x is no more than about 0.5. When copolymers are employed without the presence of a second α-olefin, the copolymers are represented by the above formula I wherein y is 0. When y is other than 0, i.e., terpolymers are employed, the ratio of y:x is preferably from about 0.01 to about 0.1. The end groups or "caps" of the polymer will depend upon what materials were present during the production of the polymer and whether or how the polymer was purified. The end groups will be of little significance so far as the overall properties of the polymer are concerned so that the polymer is fairly represented by the formula for the polymeric chain as depicted above.

Of particular interest as reactants in the process of the invention are the polymers of the above formula having a molecular weight from about 1000 to about 200,000, particularly those having a number average molecular weight of from about 20,000 to about 90,000 as determined by gel permeation chromatography. The properties of the polymer will in part be determined by the molecular weight, whether the polymer is a copolymer or a terpolymer and, in the case of terpolymers, the nature of and the proportion of the second α-olefin present. These polymers will typically have melting points of from about 175° C. to about 300° C., more often from about 210° C. to about 280° C. The polymers have a limiting viscosity number, as measured in m-cresol at 60° C., of from about 0.4 dl/g to about 10 dl/g, preferably from about 0.8 dl/g to about 4 dl/g.

The polyketone polymers are produced according to the general procedures of the above European Patent applications. Although the scope of the polymerization is extensive, a preferred catalyst composition is formed from a palladium salt, particularly a palladium alkanoate such as palladium acetate, the anion of trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The carbon monoxide and hydrocarbon(s) are contacted under polymerization conditions in a liquid reaction diluent. Lower alkanols are suitable as the reaction diluent and methanol is preferred. Typical polymerization conditions include a reaction temperature of from about 30° C. to about 135° C. and a reaction pressure of from about 10 bar to about 100 bar. The polyketone is generally produced as a suspension in the reaction diluent and is recovered by conventional procedures such as filtration or decantation. The polyketone polymer product is employed in the process of the invention as such or is purified by contacting the polymer with a solvent which is selective for the catalyst residues.

The hydrogenation process of the invention is conducted by contacting the linear alternating polymer of carbon monoxide and at least one ethylenically unsaturated hydrocarbon under hydrogenation conditions with molecular hydrogen in a reaction diluent in the presence of a catalytic quantity of a catalyst formed from a nickel compound and certain alkali metal hydrides. The reaction diluent is preferably a diluent which is inert to the reactants and the polyalcohol product and is a diluent in which the polymeric polyalcohol product is at least partially soluble. Hydroxylic diluents are satisfactory such as lower alkanols, e.g., methanol, ethanol and isopropanol, lower glycols such as ethylene glycol, trimethylene glycol and diethylene glycol, and glycol ethers such as ethylene glycol monomethyl ether and diethylene glycol monoethyl ether. The lower alkanols are preferred, particularly methanol.

The catalyst employed in the hydrogenation process of the invention is formed from a nickel salt and one or more of certain ternary alkali metal hydrides of the formula $XYH_4$ wherein X is an alkali metal, e.g., lithium, sodium, potassium, rubidium or cesium, and Y is boron or aluminum. A variety of such alkali metal hydrides are useful as precursors of the catalyst of the invention including sodium borohydride, lithium borohydride, sodium aluminum hydride and potassium aluminum hydride. In part because of the availability thereof, lithium borohydride and sodium aluminum hydride are preferred. The nickel salts from which the catalysts are suitably formed are salts of nickel with inorganic anions such as nickel chloride, and nickel sulfate, or salts of nickel with organic anions such as nickel propionate, nickel acetate and nickel acetylacetonate. The preferred nickel salts are nickel alkanoates and particularly preferred is nickel acetate. The alkali metal hydride is preferably employed in a molar amount which is equal to or greater than the molar quantity of the nickel salt. A molar excess of the alkali metal hydride does not generally provide any substantial advantage and quantities of alkali metal hydride and nickel salt that are substantially equimolar are preferred. The catalyst is prepared in situ in the reaction diluent before or after the polymer reactant and/or the hydrogen are added, or is prepared separately and added to the hydrogenation mixture as such. Sufficient catalyst is employed to provide to the hydrogenation mixture from about 0.5% by weight to about 20% by weight of nickel based on total linear unsaturated polymer to be hydrogenated. Preferred quantities are from about 1% by weight to about 10% by weight of nickel on the same basis.

The hydrogenation conditions include an elevated reaction temperature of from about 100° C. to about 200° C. although hydrogenation temperatures of from about 120° C. to about 180° C. are preferred. Suitable hydrogenation pressures are from about 10 bar to about 200 bar, but preferred pressures are from about 40 bar to about 100 bar.

Subsequent to the hydrogenation process, the reaction is terminated as by cooling the reaction mixture and releasing the pressure. The polymeric polyalcohol is typically obtained in solution in the reaction diluent and after the insoluble catalyst and any unreacted polyketone polymer are recovered as by filtration, the polyalcohol is recovered by conventional methods such as solvent removal, extraction or precipitation as by addition of a non-solvent for the polyalcohol such as water.

The polymeric polyalcohol product has a plurality of functional groups on the polymer chain separated by two carbon connecting groups. There will be present a certain proportion of unreacted carbonyl groups as well as a higher proportion of the desired secondary alcohol groups which result from hydrogenation of the carbonyl groups. In addition, there will be proportions of 2-hydroxy-2,5-tetrahydrofurandiyl moieties and 2,5-tetrahydrofurandiyl moieties. The first of these moieties can be regarded as a hemi-ketal formed by cyclization of a secondary alcohol group, an adjacent unreacted carbonyl group and the intervening two carbon connecting group. The 2,5-tetrahydrofurandiyl group is considered to likely arise from dehydration of a 2-hydroxy-2,5-tetrahydrofurandiyl group followed by hydrogenation of the carbon-carbon double bond thereby formed. Expressed differently, the polymeric polyalcohol will have a number of monomeric two-carbon connecting groups, i.e., —C—C— groups, connecting carbonyl groups, i.e.,

groups, secondary alcohol groups, i.e.,

groups, 2-hydroxytetrahydrofurandiyl groups, i.e.,

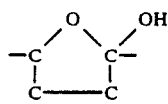

groups, and 2,5-tetrahydrofurandiyl groups, e.g.,

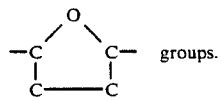 groups.

In the case of the copolymers of carbon monoxide and ethylene, the remaining valences of the carbon atoms of the above groups will be satisfied with hydrogen. In the case of the preferred terpolymers of carbon monoxide, ethylene and propylene, a portion of the monomeric two-carbon connecting groups will have one carbon substituted with a methyl group, i.e., the connecting group will be

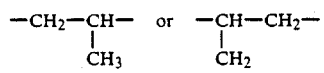

depending upon the geometry of the polymerization leading to the polyketone reactant, and certain of the cyclic groups depicted above will be substituted in the 3 or in the 4 position with a methyl group. The structures of other polymeric products will be apparent from consideration of the above description and the structure of the polyketone starting material.

The polymeric polyalcohol products are thermoplastic and are processed by methods conventional for thermoplastics, e.g., extrusion, injection molding and thermoforming, into sheets useful for packaging, wires and cables and shaped articles such as containers for food and drug. The polyalcohol products may also contain additives such as stabilizers, fillers, dyes and mold release agents which are incorporated into the polyalcohol by conventional methods.

The invention is further illustrated by the following Illustrative Embodiments which should not be construed as limiting the invention.

ILLUSTRATIVE EMBODIMENT I

A terpolymer of carbon monoxide, ethylene and propylene was prepared by introducing 160 ml of methanol into a mechanically stirred autoclave of 250 ml capacity. After removing the air present in the autoclave by evacuation, the contents of the autoclave were heated to 85° C. and 48 ml of propylene was added to give a pressure in the autoclave of 14 bar. Carbon monoxide was then added until a pressure of 34 bar was reached and ethylene was added until a pressure of 56 bar was reached. A catalyst composition solution was then added which comprised 4.5 ml of methanol, 1.5 ml of toluene, 0.1 mmol of palladium acetate, 0.193 mmol of trifluoroacetic acid and 0.012 mmol of 1,3-bis[di(2-methoxyphenyl)phosphino]propane. During the reaction which followed, the pressure was maintained by adding an equimolar mixture of carbon monoxide and ethylene. After 3 hours, the reaction was terminated by cooling the autoclave and contents to room temperature and releasing the pressure. The polymer product was recovered by filtration, washed with methanol and dried at room temperature. The polymer yield was 21 g of terpolymer having a melting point of 224° C. The polymer was shown by $^{13}$C-NMR analysis to have random units of $-CO+C_2H_4+$ and $-CO+C_3H_6+$ in a ratio of about 18:1.

ILLUSTRATIVE EMBODIMENT II

A polymeric polyalcohol was prepared by the following procedure. A mixture of 5 mmol of nickel acetate and 25 ml of tetrahydrofuran was introduced into an autoclave of 250 ml capacity equipped with a mechanical stirrer. The air present in the autoclave was replaced by nitrogen and 5 mmol of sodium borohydride was added. The contents of the autoclave were then heated to 50° C. and maintained at that temperature for 1 hour. A suspension of 10 g of the terpolymer of Illustrative Embodiment I in 100 ml of methanol was added and the autoclave was pressurized with hydrogen to 60 bar. The temperature within the autoclave was raised to 150° C. and maintained for 5 hours, during which the pressure within the autoclave dropped by 20 bar. The reaction was terminated by cooling to room temperature and releasing the pressure. The catalyst was removed by filtration and the methanol and tetrahydrofuran were removed by evaporation. A polymeric polyalcohol, 9.6 g, was obtained of the composition shown in the Table below.

ILLUSTRATIVE EMBODIMENT III

A carbon monoxide/ethylene/propylene terpolymer was produced by a method substantially similar to that of Illustrative Embodiment I except that
a) 140 ml of methanol was used instead of 160 ml,
b) 66 ml of propylene was used instead of 48 ml and the pressure in the autoclave reached 17 bar,
c) carbon monoxide was introduced until the pressure reached 29 bar instead of 34 bar, and
d) the reaction time was 8 hours instead of 3 hours. The terpolymer product obtained, 25.2 g, had a melting point of 225° C. and was shown by $^{13}$C-NMR to have a structure of random $-CO+C_2H_4+$ units are $-CO-C_3H_6-$ units in a ratio of 19:1.

ILLUSTRATIVE EMBODIMENT IV

A polymeric polyalcohol was prepared by a procedure substantially similar to that of Illustrative Embodiment II, except that
a) a suspension of 9 g of the terpolymer of Illustrative Embodiment III was used instead of the suspension of the terpolymer of Illustrative Embodiment I,
b) the heating was for 5 hours at 140° C. instead of at 150° C.,
c) the pressure drop was 15 bar instead of 20 bar, and
d) after removing the catalyst by filtration, water was added to the filtrate to precipitate 9 g of polymeric polyalcohol, the structure of which is shown in the Table below.

ILLUSTRATIVE EMBODIMENT V

A polymeric polyalcohol was prepared by a method substantially similar to that of Illustrative Embodiment II, except that
a) 10 mmol of nickel acetate and 10 mmol of sodium borohydride were used instead of 5 mmol of each,
b) a suspension of 5 g of the terpolymer of Illustrative Embodiment III in 50 ml of methanol was used instead of the suspension of 10 g of the terpolymer of Illustrative Embodiment I in 100 ml of methanol,
c) the reaction temperature was 125° C. instead of 150° C.,
d) the pressure drop was 12 bar instead of 20 bar, and e) after polymerization was terminated the catalyst was removed by filtration and water was added to precipitate 4.5 g of polymeric alcohol, the structure of which is shown in the Table below.

ILLUSTRATIVE EMBODIMENT VI

A copolymer of carbon monoxide and ethylene was prepared by a method substantially similar to that of Illustrative Embodiment I, except that
a) no propylene was added,
b) 150 ml of methanol was used instead of 160 ml,
c) the polymerization temperature was 90° C. instead of 85° C., and
d) carbon monoxide was added until a pressure of 13 bar was reached instead of 34 bar, and ethylene was added until a pressure of 20 bar was reached instead of 56 bar.

The copolymer product, 25 g, had a melting point of 257° C. and was shown by $^{13}$C-NMR analysis to consist of repeating $-CO-(-C_2H_4-)$ units.

ILLUSTRATIVE EMBODIMENT VII

A polymeric polyalcohol was produced by a method substantially similar to that of Illustrative Embodiment II, except that
a) a suspension of 5 g of the copolymer of Illustrative Embodiment VI in 100 ml of methanol was used instead of the suspension of 10 g of the terpolymer of Illustrative Embodiment I,
b) the polymerization time and temperature were 5 hours at 140° C. instead of at 150° C.,
c) the pressure drop was 15 bar instead of 20 bar, and
d) after the polymerization was terminated and the catalyst had been removed by filtration, water was added to the filtrate to precipitate 9 g of polymeric polyalcohol, the structure of which is shown in the Table below.

ILLUSTRATIVE EMBODIMENT VIII

A copolymer of carbon monoxide and ethylene was produced by introducing into a mechanically stirred autoclave of 250 ml capacity a catalyst composition solution comprising 50 ml of methanol, 0.1 mmol of palladium acetate, 0.2 mmol of copper p-toluenesulfonate and 0.12 mmol of 1,3-bis(diphenylphosphino)propane. The air in the autoclave was removed by evacuation and 50 ml of propylene were added and carbon monoxide was introduced until a pressure of 60 bar was reached. The contents of the autoclave were heated to 65° C. and maintained at that temperature for 5 hours. The polymerization was then terminated by cooling the autoclave and contents to room temperature and releasing the pressure. The methanol was then removed under vacuum to yield 11 g of a copolymer whose structure was shown by $^{13}$C-NMR to be repeating $-CO-(-C_3H_6-)$ units.

ILLUSTRATIVE EMBODIMENT IX

A polymeric polyalcohol was prepared by a method substantially similar to that of Illustrative Embodiment II except that
a) 5 g of the copolymer of Illustrative Embodiment VIII were employed instead of 10 g of the terpolymer of Illustrative Embodiment I, and
b) the pressure drop was 3 bar instead of 20 bar. A yield of 4 g of polymeric polyalcohol was obtained.

ILLUSTRATIVE EMBODIMENT X

A polymeric polyalcohol was prepared by a method substantially similar to that of Illustrative Embodiment II except that
a) 10 mmol of nickel acetate and 10 mmol of sodium borohydride was used instead of 5 mmol of each,
b) heating was for 0.5 hour at 50° C. instead of 1 hour,
c) a suspension of 5 g of the polymer of Illustrative Embodiment I in 50 ml of methanol was employed instead of a suspension of 10 g in 100 ml,
d) heating was for 5 hours at 120° C. instead of 150° C.,
e) the pressure drop was 9 bar instead of 20 bar, and
f) when the polymerization was terminated and the catalyst removed by filtration, water was added to the filtrate to precipitate 2.5 g of polymeric polyalcohol.

TABLE

| Illustrative Embodiment | II | IV | V | VII |
|---|---|---|---|---|
| Unconverted Carbonyl, % | 13 | 8.5 | 1 | 3.5 |
| Secondary Alcohol Group, % | 70 | 34 | 73 | 36 |
| 2,5-Tetrahydrofurandiyl Group, % | 10 | 34 | 19 | 45.5 |
| 2-Hydroxy-2,5-tetrahydrofurandiyl Group, % | 7 | 23.5 | 7 | 15 |

What is claimed is:

1. A process of producing a polymeric polyalcohol having a plurality of functional groups on the polymer chain separated by two carbon connecting groups, the functional groups being carbonyl, secondary alcohol, 2-hydroxy-2,5-tetrahydrofurandiyl and 2,5-tetrahydrofurandiyl, by contacting under hydrogenation conditions, including a temperature from about 100° C. to about 200° C. and a pressure from about 10 bar to about 200 bar, (1) a linear alternating polymer of carbon monoxide amd at least one α-olefin, and (2) molecular hydrogen, in the presence of a catalyst formed from a nickel salt and sodium borohydride, lithium borohydride, potassium aluminum hydride, or sodium aluminum hydride.

2. The process of claim 1 wherein the linear alternating polymer is represented by the repeating formula

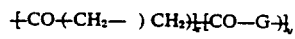

wherein G is a moiety of an α-olefin of at least 3 carbon atoms polymerized through the ethylenic unsaturation thereof, and the ratio of y:x is no more than about 0.5.

3. The process of claim 2 wherein y is 0.

4. The process of claim 3 wherein the nickel salt is a nickel alkanoate.

5. The process of claim 4 wherein the nickel salt is nickel acetate.

6. The process of claim 2 wherein the ratio of y:x is from about 0.01 to about 0.1.

7. The process of claim 6 wherein G is a moiety of propylene.

8. The process of claim 7 wherein the nickel salt is a nickel alkanoate.

9. The proces of claim 8 wherein the nickel salt is nickel acetate.

* * * * *